(12) United States Patent
Scalia et al.

(10) Patent No.: US 8,849,332 B2
(45) Date of Patent: Sep. 30, 2014

(54) APPARATUS AND METHOD FOR CONTROLLING A NODE OF A WIRELESS COMMUNICATION SYSTEM

(75) Inventors: Luca Scalia, Munich (DE); Thorsten Biermann, Oberschleissheim (DE); Changsoon Choi, Munich (DE); Wolfgang Kellerer, Fuerstenfeldbrueck (DE); Kazuyuki Kozu, Munich (DE)

(73) Assignee: NTT DoCoMo, Inc., Tokyo (JP)

( * ) Notice: Subject to any disclaimer, the term of this patent is extended or adjusted under 35 U.S.C. 154(b) by 333 days.

(21) Appl. No.: 13/332,885

(22) Filed: Dec. 21, 2011

(65) Prior Publication Data
US 2012/0165063 A1 Jun. 28, 2012

(30) Foreign Application Priority Data
Dec. 22, 2010 (EP) .................................... 10196534

(51) Int. Cl.
| H04W 72/00 | (2009.01) |
| H04B 7/00 | (2006.01) |
| H04W 40/00 | (2009.01) |
| H04W 52/34 | (2009.01) |

(52) U.S. Cl.
CPC .............. H04W 52/343 (2013.01); Y02B 60/50 (2013.01)
USPC ........... 455/512; 455/513; 455/522; 455/446; 455/524

(58) Field of Classification Search
CPC .................................................. H04W 52/343
USPC .......................... 455/436, 439, 442, 453, 509
See application file for complete search history.

(56) References Cited

U.S. PATENT DOCUMENTS

| 7,158,796 | B2 | | 1/2007 | Tiedemann, Jr. et al. |
| 7,570,956 | B2 | * | 8/2009 | Bigham et al. ................ 455/453 |
| 7,680,897 | B1 | * | 3/2010 | Carter et al. .................. 709/217 |
| 8,626,109 | B2 | * | 1/2014 | Ma et al. .................... 455/343.2 |
| 2004/0043764 | A1 | * | 3/2004 | Bigham et al. ............. 455/422.1 |
| 2013/0244670 | A1 | * | 9/2013 | Biermann et al. ........... 455/446 |

FOREIGN PATENT DOCUMENTS

| RU | 2 124 809 C1 | 1/1999 |
| RU | 2 364 056 C2 | 6/2006 |
| WO | WO 2005/060277 A2 | 6/2005 |
| WO | WO 2009/115554 A1 | 9/2009 |

OTHER PUBLICATIONS

Benjebbour, Anass et al., "Evaluation of User Throughput for MU-MIMO Coordinated Wireless Networks," Sep. 2008, IEEE 19th International Symposium on Personal, Indoor and Mobile Radio Communications, 5 pages.

(Continued)

Primary Examiner — Tilahun B Gesesse
(74) Attorney, Agent, or Firm — Brinks Gilson & Lione

(57) ABSTRACT

An apparatus for controlling a node of a wireless communication system has a traffic load determiner, a cooperation capacity determiner and a power control unit. The traffic load determiner determines a traffic load in the wireless communication system and the cooperation capacity determiner determines an available cooperation capacity of the node with another node of the wireless communication system. Further, the power control unit activates or deactivates an antenna of a node based on the determined traffic load and the determined available capacity.

10 Claims, 14 Drawing Sheets

(56) References Cited

OTHER PUBLICATIONS

Gong, Jie et al., "Traffic-Aware Base Station Sleeping in Dense Cellular Networks," Jun. 2010, 18th International Workshop on Quality of Service (IWQoS), 2 pages.

Jungnickel, V. et al., "Coordinated Multipoint Trials in the Downlink," 2009, IEEE Globecom Workshops, 7 pages.

Micallef, Gilbert et al., "Cell Size Breathing and Possibilities to Introduce Cell Sleep Mode," 2010, European Wireless Conference, pp. 111-115.

Saker, L. et al., "System selection and sleep mode for energy saving in cooperative 2G/3G Networks," Sep. 2009, IEEE 70th Vehicular Technology Conference Fall, 5 pages.

Saker, Louai et al., "Minimizing energy consumption via sleep mode in green base station," Apr. 2010, IEEE Wireless Communications and Networking Conference, 6 pages.

Unknown author, "Green Radio—NEC's approach towards Energy-efficient Radio Access Networks," Feb. 2010, NEC Corporation, 5 pages.

Venkatesan, Sivarama et al., "A WiMAX-based Implementation of Network MIMO for Indoor Wireless Systems," Journal on Advances in Signal Processing, Feb. 2009, 35 pages.

Yang, Wei et al., "Energy-Efficient Relay Selection and Optimal Relay Location in Cooperative Cellular Networks with Asymmetric Traffic," The Journal of China Universities of Posts and Telecommunications, Sep. 2010, 10 pages.

Zhou, Sheng et al., "Green Mobile Access Network with Dynamic Base Station Energy Saving," Proc of ACM MobiCom, 2009, vol. 9, Issue 262, 3 pages.

\* cited by examiner

APPARATUS AND METHOD FOR CONTROLLING A NODE OF A WIRELESS COMMUNICATION SYSTEM

RELATED APPLICATIONS

This application claims priority under 35 U.S.C. §119 to European Patent Application No. 10196534.1 filed on Dec. 22, 2010, the entire content of which is hereby incorporated by reference.

BACKGROUND OF THE INVENTION

Embodiments according to the invention relate to wireless communication system and particularly to an apparatus and a method for controlling a node of a wireless communication system.

In a MIMO-capable base station, each of the antennae that constitutes the MIMO system is connected to a power amplifier that provides the needed amplification for transmitting and receiving the analog signals. Baseband processing is usually performed in a common block that is shared by all the antennae. Referring to FIG. 3, it is evident from it that up to 80% of the overall energy consumption of a base station comes from the power amplifier (see for example "L. Saker, S-E. Elayoubi and H. O. Scheck, System selection and sleep mode for energy saving in cooperative 2G/3G networks, IEEE VTC-fall 2009, Anchorage, September 2009").

On the other hand, it has also been shown that minimizing the usage of the power amplifiers still does not provide any benefit in terms of reduction of energy consumption (see "Micallef, G.; Mogensen, P.; Scheck, H.-O., "Cell Size Breathing and Possibilities to Introduce Cell Sleep Mode", in Proc. of European Wireless 2010, Lucca, Italy"). This is due to the design choices of the current power amplifiers, which need a lot power supply even when they are not actively used.

FIG. 4 shows the impact of the traffic pattern on energy consumption. As it can be seen from it, in low load conditions, the base station operation consumes a lot of energy. The base station hardware in fact is usually tailored to be efficient only at high traffic loads, being dimensioned to provide the needed capacity also during the traffic peaks.

Putting these considerations in relation to a 24 hours mobile traffic scenario (FIG. 2), as measured in real UMTS cells, it can already be seen how big the room can be for energy improvement in cellular systems.

Base station networking has attracted a lot of research attention recently, due to the relevant benefits achievable in terms of wireless transmission capacity, inter-cell interference management and reduction of energy consumption at the individual cell sites.

Referring to energy efficiency of the mobile network, the use of base station sleeping modes triggered by traffic load analysis has been proposed in some recent research papers (see for example "Jie Gong, Sheng Zhou, ZhishengNiu, Peng Yang, "Traffic-aware base station sleeping in dense cellular networks", in Proc. of IEEE IWQOS 2010", "Sheng Zhou, Jie Gong, Zexi Yang, ZhishengNiu and Peng Yang, "Green Mobile Access Network with Dynamic Base Station Energy Saving", in Proc. of ACM Mobicom 2009" and "LouaiSaker, Salah-EddineElayoubi, TijaniChahed, "Minimizing energy consumption via sleep mode in green base station", in Proc. of IEEE 2010") and network vendors' works (see for example "Micallef, G.; Mogensen, P.; Scheck, H.-O., "Cell Size Breathing and Possibilities to Introduce Cell Sleep Mode", in Proc. of European Wireless 2010, Lucca, Italy" and "Green Radio, "NEC's Approach towards Energy-efficient Radio Access Networks". Whitepaper, February 2010"). The idea behind the enabling of sleeping modes at base station is to back up the needed coverage/capacity of the sleeping base station by enlarging the coverage area of one or more surrounding ones.

There are also some local approaches, which use, for example, a scheduling with a queue, which waits and transmits when the channel is good as shown for example in FIG. 5. Other configurations can range from MIMO (multiple input multiple output) up to SISO (single input single output) configurations, as shown for example in FIG. 6. Each mobile device 610 is addressed by only one antenna 620 of the base station 630.

There are distributed and centralized approaches, as for example, a coordination between base stations for energy saving, which switches off some base station sites and provides a same coverage, which is called cell breathing technique (increased transmit range of some neighbor cells). An example for four base stations 710 with one deactivated base station 720 is shown in FIG. 7.

In "Jie Gong, Sheng Zhou, ZhishengNiu, Peng Yang, "Traffic-aware base station sleeping in dense cellular networks", in Proc. of IEEE IWQOS 2010", the authors propose a sleeping-mode scheme that switches off some base stations when the traffic load is low. The constraint the authors introduce is based on the guaranteeing of a certain blocking probability. The authors also propose a minimum sleeping-mode holding time to avoid frequent on/off switching at base stations.

In "LouaiSaker, Salah-EddineElayoubi, TijaniChahed, "Minimizing energy consumption via sleep mode in green base station", in Proc. of IEEE 2010", two radio allocation schemes are proposed that activate resources only when they are needed to satisfy user demand and QoS requirement. The first scheme is dynamic. It switches resources ON and OFF as a function of the instantaneous change of the load in the system, which in turn follows the users arrivals and departures. The second scheme is semi-static. It activates and deactivates resources when the mean traffic load varies in the system.

In "S. Zhou, J. Gong, Z. Yang, Z. Niu, and P. Yang, "Green mobile access network with dynamic base station energy saving," MobiCom '09 poster, September 2009", dynamically turning off certain BS is considered when the network traffic is low. Centralized and decentralized implementations are investigated. The assumption is that all the channel information and the traffic requirements is known at the network side. Energy efficiency of the proposed algorithms and the tradeoff between energy saving and coverage guarantee.

SUMMARY OF THE INVENTION

According to an embodiment, an apparatus for controlling a node of a wireless communication system, wherein the node has a plurality of antennas, may have a traffic load determiner configured to determine a traffic load in the wireless communication system; a cooperation capacity determiner configured to determine an available cooperation capacity of the node with another node of the wireless communication system; and a power control unit configured to activate or deactivate an antenna of the node based on the determined traffic load and the determined available cooperation capacity.

According to another embodiment, a method for controlling a node of a wireless communication system, wherein the node has a plurality of antenna, may have the steps of determining a traffic load in the wireless communication system; determining an available cooperation capacity of the node with another node of the wireless communication system; and activating or deactivating an antenna of the node based on the determined traffic load and the determined available cooperation capacity.

According to another embodiment, a computer program with a program code may perform the method for controlling a node of a wireless communication system, wherein the node has a plurality of antenna, the method having the steps of determining a traffic load in the wireless communication system; determining an available cooperation capacity of the node with another node of the wireless communication system; and activating or deactivating an antenna of the node based on the determined traffic load and the determined available cooperation capacity, when the computer program runs on a computer or a microcontroller. An embodiment of the invention provides an apparatus for controlling a node of a wireless communication system. The node comprises a plurality of antennas and the apparatus comprises a traffic load determiner, a cooperation capacity determiner and a power control unit. The traffic load determiner is configured to determine a traffic load in the wireless communication system and the cooperation capacity determiner is configured to determine an available cooperation capacity of the node with another node of the wireless communication system. Further, the power control unit is configured to activate or deactivate an antenna of the node based on the determined traffic load and the determined available cooperation capacity.

Embodiments according to the present invention are based on the central idea that one or more antennas of a node (e.g. a base station) of a wireless communication system can be deactivated when the traffic load within the wireless communication is low. This deactivation of antennas is done under consideration of an available cooperation capacity of the nodes of the wireless communication system. Therefore, it may be enabled to deactivate more antennas of a node than without consideration of a cooperation capacity, since more than one node can satisfy a needed data rate of a user together. In this way, the average number of active antennas can be significantly reduced, which may result directly in a reduced energy consumption.

In some embodiments according to the invention, the number of active antennas of the plurality of antennas of the node is increased, if the determined traffic load is lower than a lower load threshold, and the number of active antennas may be decreased, if the determined traffic load is higher than an upper load threshold. In this way, the number of active antennas can be dynamically adapted to the current traffic load of the wireless communication system.

In some embodiments according to the invention, the power control unit may activate or deactivate an antenna of the node by activating or deactivating a power amplifier of a transmitter connected to the antenna. In this way, the high energy consumption of one or more power amplifiers of the antennas of a node can be avoided, if the traffic load is low.

BRIEF DESCRIPTION OF THE DRAWINGS

Embodiments according to the invention will be detailed subsequently referring to the appended drawings, in which.

DETAILED DESCRIPTION OF THE PREFERRED EMBODIMENTS

Figure 1:
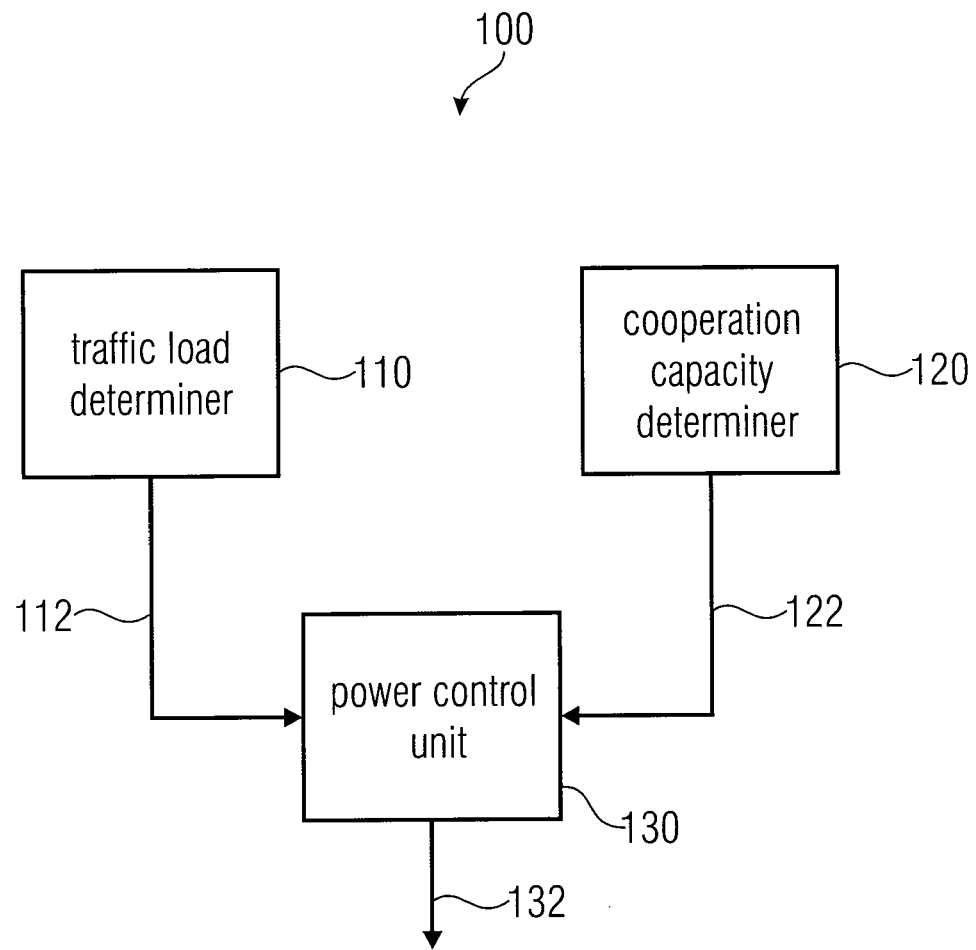
FIG. 1 is a block diagram of an apparatus for controlling a node of a wireless communication system.
Figure 2:
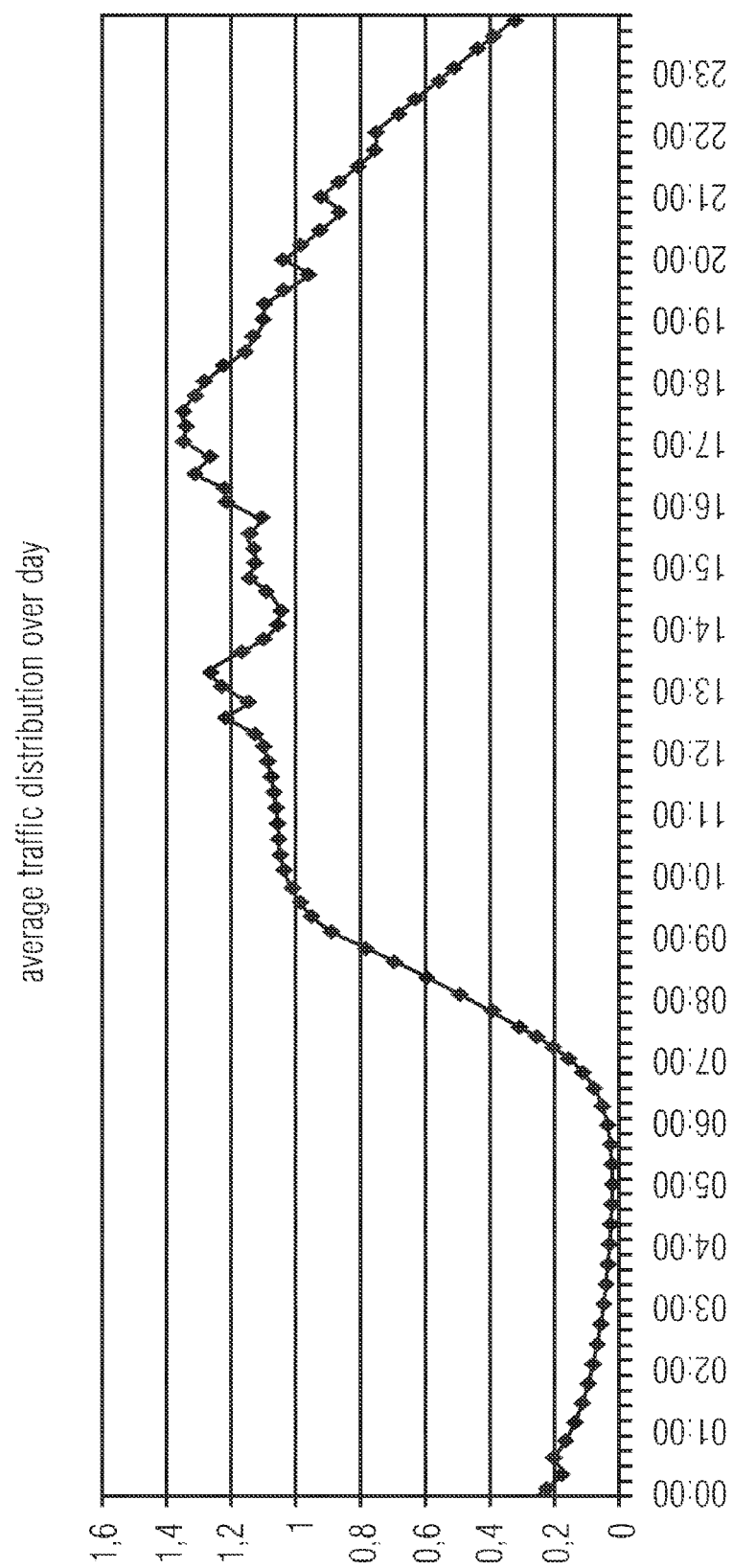
FIG. 2 is a diagram indicating an average traffic pattern as measured in a mobile network cell during a day.

In the following, the same reference numerals are partly used for objects and functional units having the same or similar functional properties and the description thereof with regard to a figure shall apply also to other figures in order to reduce redundancy in the description of the embodiments.

Several techniques have been proposed so far in the context of network MIMO (joint precoding, coordinated scheduling and beamforming and so on, see for example "V. Jungnickel, L. Thiele, T. Wirth, T. Haustein, S. Schiffermüller, A. Forck, S. Wahls, S. Jaeckel, S. Schubert, H. Gäbler, and others, "Coordinated Multipoint Trials in the Downlink," Proc. 5th IEEE Broadband Wireless Access Workshop (BWAWS), IEEE, 2009, pp. 1-7", "S. Venkatesan, H. Huang, A. Lozano, and R. Valenzuela, "A WiMAX-based Implementation of Network MIMO for Indoor Wireless Systems," EURASIP Journal on Advances in Signal Processing, vol. 2009, p. 3" and "A. Benjebbour, M. Shirakabe, Y. Ohwatari, J. Hagiwara, and T. Ohya, "Evaluation of User Throughput for MU-MIMO Coordinated Wireless Networks," 2008 IEEE 19th International Symposium on Personal, Indoor and Mobile Radio Communications, Ieee, 2008"), each of them achieving different performance merits.

In "YANG Wei, LI Li-hua, SUN Wan-lu, "Energy-Efficient Relay Selection and Optimal Relay Location in Cooperative Cellular Networks with Asymmetric Traffic", in "The Journal of China Universities of Posts and Telecommunications", Elsevier, September 2010", relay nodes' cooperation with base stations is evaluated in terms of energy consumption. Energy-efficient cooperation regions are investigated. The cooperation energy-gain is defined as the percentage of energy saving achieved by cooperation to get the same spectral efficiency as the direct transmission between MS and BS.

Only the intrinsic performance gains of base station cooperation are considered. Similar approaches are used in the wireless sensor network extent.

In "L. Saker, S-E. Elayoubi and H. O. Scheck, System selection and sleep mode for energy saving in cooperative 2G/3G networks, IEEE VTC-fall 2009, Anchorage, September 2009" cooperation between 2G and 3G systems is also regarded as a mean for energy saving.

Figure 8:
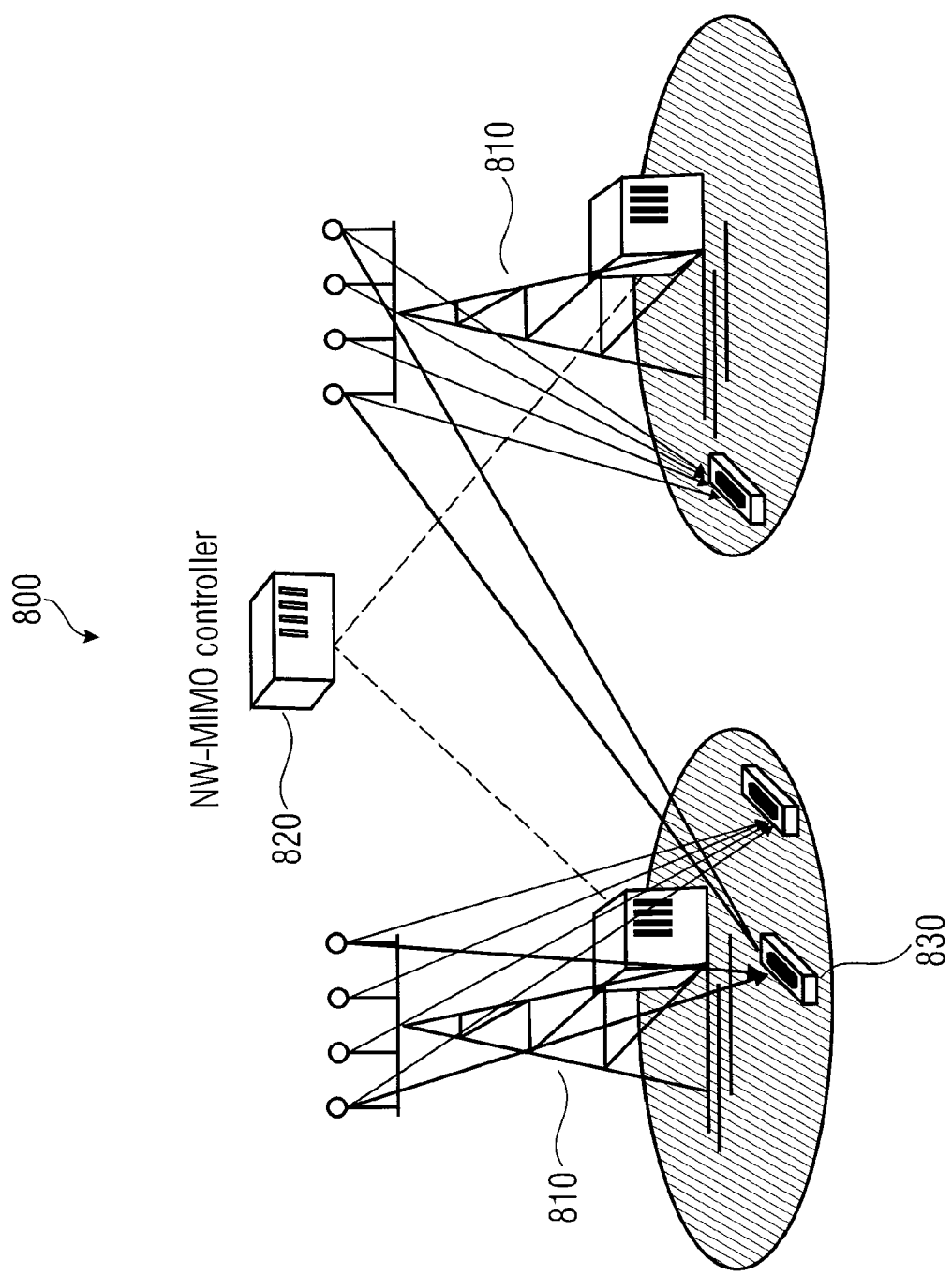
FIG. 8 is a schematic illustration of a network MIMO configuration.
Figure 9:
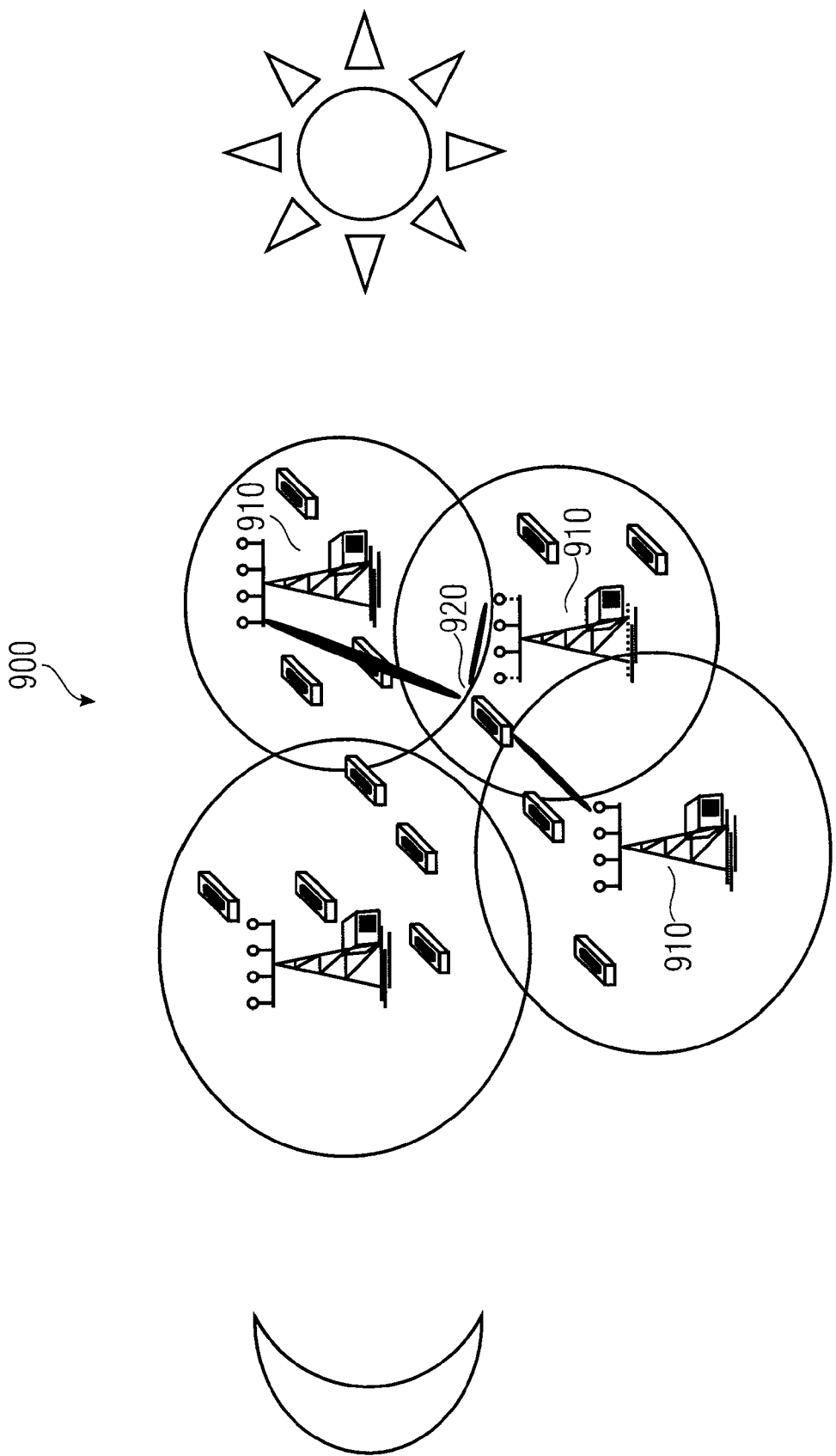
FIG. 9 is a schematic illustration of a further example of a network MIMO configuration.

In the following, a cellular network 800 that allows for network MIMO techniques (target network configuration) may be assumed, as it is shown, for example, in FIG. 8. In this example, two base stations 810 (nodes), each equipped with four antennas, are illustrated. Further, a network-MIMO controller 820 controlling a cooperative transmission to a wireless device 830 or a cooperative reception from a wireless device 830 is shown. Another example 900 for the use of a cooperative network-MIMO technique, for example, for keeping the highest (possible) number of antennas off or to minimize the number of active antennas is shown in FIG. 9. The illustrated wireless communication system comprises three base stations 910 providing data to the same wireless device 920.

FIG. 1 shows a block diagram of an apparatus 100 for controlling a node of a wireless communication system according to an embodiment of the invention. The node to be controlled comprises a plurality of antennas. The apparatus 100 comprises a traffic load determiner 110, a cooperation capacity determiner 120 and a power control unit 130. The traffic load determiner 110 and the cooperation capacity determiner 120 are connected to the power control unit 130. The traffic load determiner 110 determines a traffic load 112 in the wireless communication system and the cooperation capacity determiner 120 determines an available cooperation capacity 122 of the node with one or more other nodes of the wireless communication system. Further, the power control unit 130 activates or deactivates an antenna of the node based on the determined traffic load 112 and the determined available cooperation capacity 122. For this, the power control unit 130 may generate a control signal 132 triggering an activation or a deactivation of an antenna of the node.

By activating or deactivating antennas of the node, the available transmission rate capacity of the node can be dynamically adapted to the current load of the wireless communication system. In this way, an average energy consumption of the node can be significantly reduced, since not all antennas are active, if the traffic load is low.

A node of a wireless communication system is, for example, a base station, a relay station or a remote computation point of the wireless communication system.

The traffic load determiner 110 may measure a traffic load 112 currently present in the wireless communication system. For example, the traffic load 112 may represent the current wireless transmission rate of the node to be controlled to one or more wireless devices (e.g. cell phone, laptop), an average wireless transmission rate of more than one node of the wireless communication system or a wireline transmission rate of the node with other nodes, a wireline transmission rate between a group of nodes in the wireless communication system or the sum of the wireless traffic generated by each user (e.g. each mobile user, each wireless device). The traffic load 112 may be expressed, for example in bits per second.

The cooperation capacity determiner 120 may determine whether or not there exists a possible set of cooperation nodes that is able to provide additional wireless resources (e.g. wireless transmission rate) to the controlled node. This may be implemented, for example, by means of a resource request inquiry process to the neighboring nodes, which will respond according to their capability of cooperating or not and the eventual amount of radio resources it can provide. In this way, the cooperation capacity determiner 120 may determine the available cooperation capacity 122 of the node to be controlled with one or more other nodes of the wireless communication system. In other words, the cooperation capacity determiner 120 may transmit a cooperation capacity request to at least one neighboring node and may determine the available cooperation capacity 122 based on a cooperation capacity respond received from the at least one neighboring node.

The power control unit 140 uses the information gathered by the traffic load determiner 110 and the cooperation capacity determiner 120 to decide whether or not an antenna of the node can be deactivated or whether or not an antenna of the node has to be activated to fulfill the needed demand of currently present users.

Figure 3:
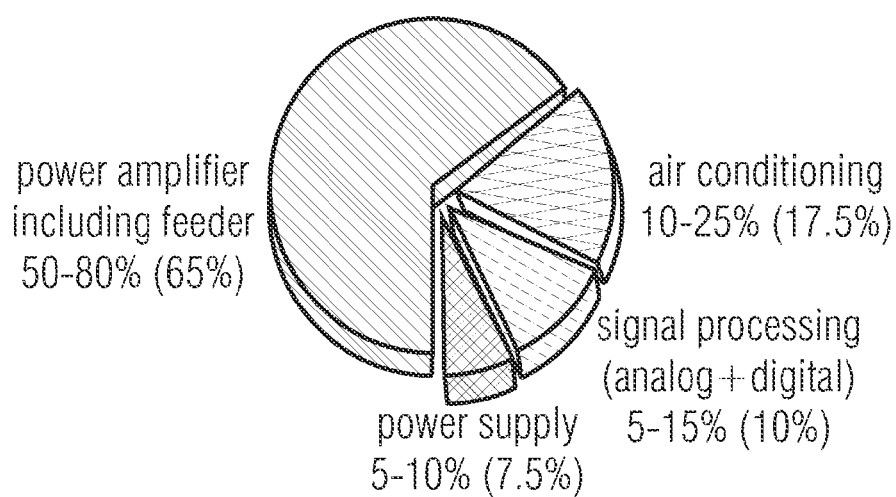
FIG. 3 is a diagram indicating an energy consumption at a base station in terms of individual components.
Figure 4:
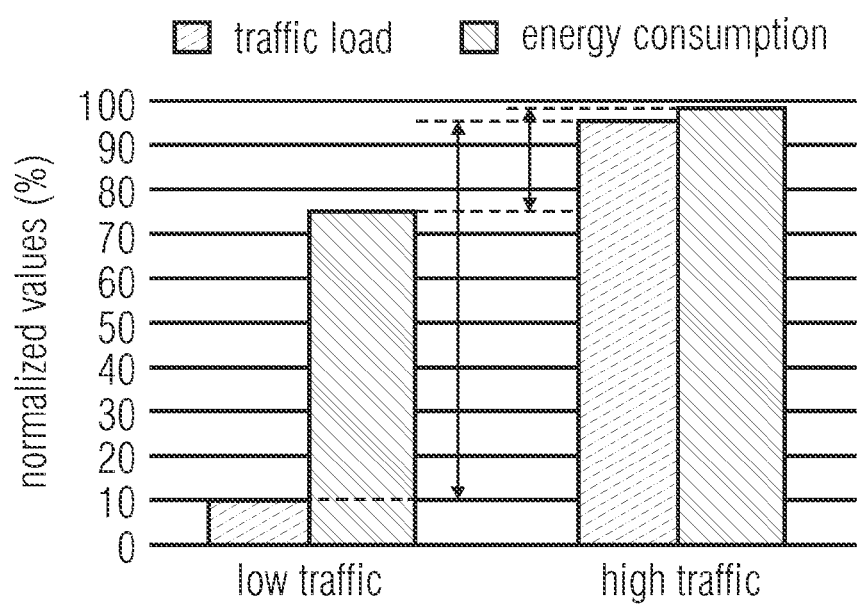
FIG. 4 is a diagram indicating a relation between traffic load and energy consumption.
Figure 5:
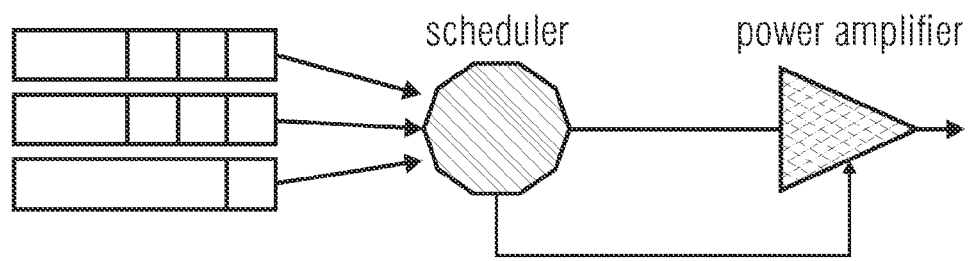
FIG. 5 is a block diagram of a scheduler and a power amplifier connected to an antenna of a base station.
Figure 6:
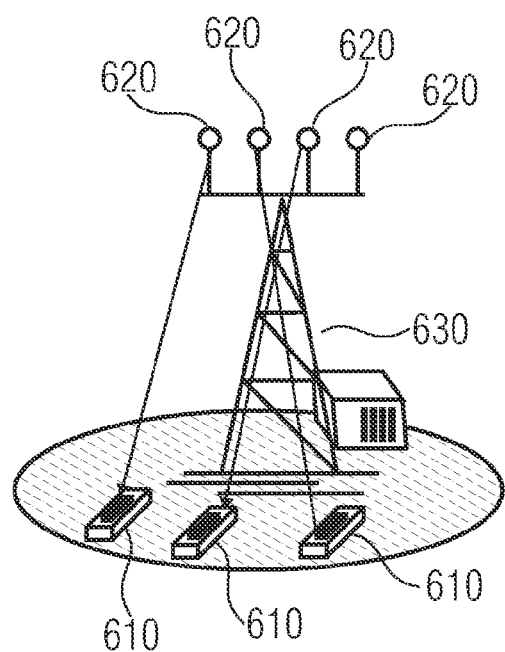
FIG. 6 is a schematic illustration of a base station providing data to mobile devices.
Figure 7:
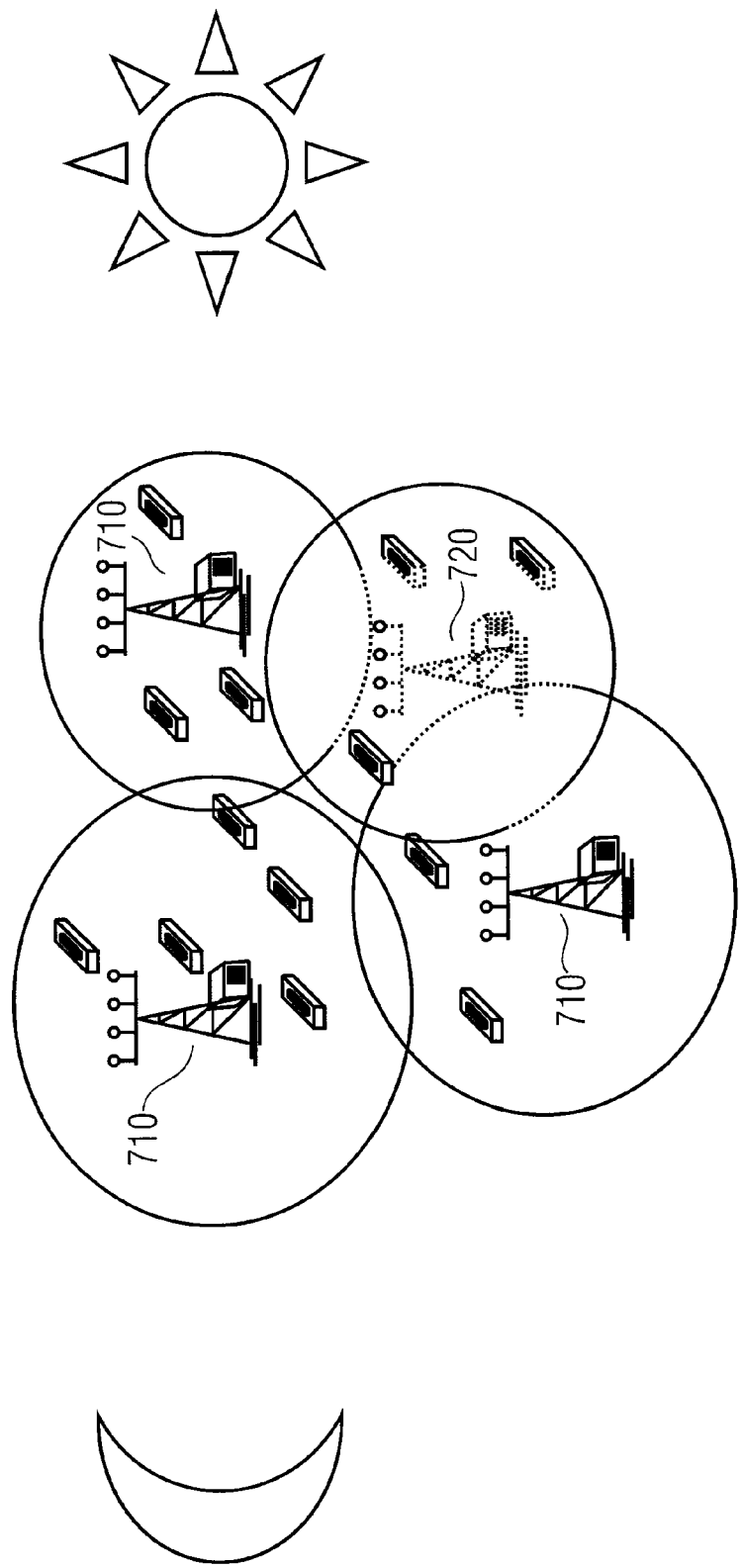
FIG. 7 is a schematic illustration of a wireless communication system illustrating a cell breathing technique.

An antenna of a node may be activated or deactivated by switching on or off, for example, the transmitter and/or the receiver connected to the antenna or by switching on or off the power amplifier of the transmitter and/or the receiver connected to the antenna. It may be sufficient to switch on or off the power amplifier of the transmitter (and/or the receiver), since this is usually the most energy consuming part of the transmitter (and/or the receiver), as also shown in FIG. 3. This activation or deactivation may be triggered by the control signal 132 provided by the power control unit 130.

Figure 10:
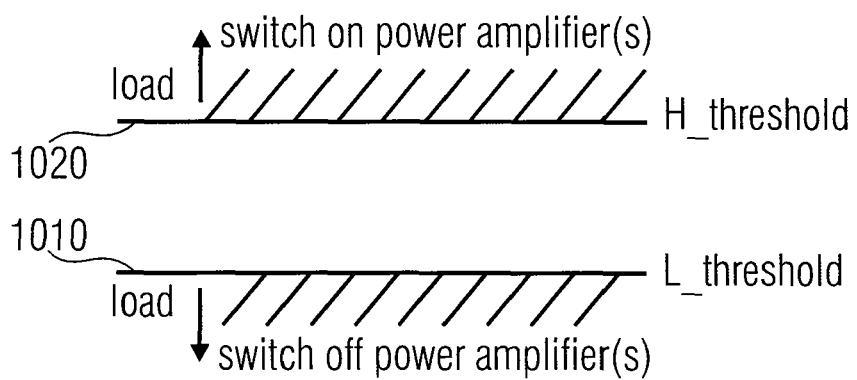
FIG. 10 is a schematic illustration of a high and a low threshold setting.

In some embodiments according to the invention, the power control unit 130 may decrease a number of active antennas of the plurality of antennas of the node, if the determined traffic load 112 is lower than a lower load threshold 1010, and may increase the number of active antennas, if the determined traffic load 112 is higher than an upper load threshold 1020. This is illustrated in FIG. 10. If the current traffic load is higher than an upper load threshold 1020 (H_threshold), the power control unit 130 may switch on, for example, a power amplifier of an additional antenna of the node. Otherwise, if the current traffic load 112 is below a lower load threshold 1010 (L_threshold), the power control unit 130 may switch off, for example, a power amplifier of an antenna of the node. If the traffic load 112 is between the upper load threshold 1020 and the lower load threshold 1010, the power control unit 130 may keep the current set of active antennas of the plurality of antennas of the node.

The power control unit 130 may determine a needed set of active antennas of the plurality of antennas based on the determined traffic load 112 and the determined available cooperation capacity 122, if the determined traffic load 112 is higher than an upper load threshold 1020 or lower than a lower load threshold 1010. Alternatively, the power control unit 130 may determine a needed set of active antennas of the plurality of antennas based on the determined traffic load 112 and the determined available cooperation capacity 122, if the determined traffic load minus the determined available cooperation capacity 122 is higher than an upper load threshold 1020 or lower than a lower load threshold 1010. Further alternatively, the determined available cooperation capacity 122 may be considered for the determination of the upper load threshold 1020 and the lower load threshold 1010 (e.g. by adding or subtracting the available cooperation capacity).

The power control unit 130 may activate or deactivate an antenna of a node based on the determined needed set of antennas.

Further, the power control unit 130 may determine the needed set of active antennas, for example, so that the quality of service constraint of at least one wireless user device (e.g. cell phone or laptop) is fulfilled. In other words, the power control unit 130 may try to find a set of active antennas of the node, which is able to fulfill the demands (one or more quality of service constraints) of the wireless user devices within a transmission range of the node or of the wireless communication system. For example, if a wireless user device needs a certain data rate, the power control unit 130 tries to find a set of active antennas able to satisfy this data rate requirement, while also considering the available cooperation capacity 122.

For example, the power control unit 130 may determine the needed set of active antennas, so that the quality of service constraint of the at least one wireless user device is satisfiable by using the determined needed set of active antennas and at least partly the determined available cooperation capacity 122 while the quality of service constraint of the at least one wireless user device is not satisfiable by using only the determined needed set of active antennas without using at least partly the determined available cooperation capacity 122. This case is of special interest, since the power control unit 130 may have to activate more antennas than the determined needed set of active antennas, if the available cooperation capacity 122 is not exploited. In other words, by using at least partly the determined available cooperation capacity 122, more antennas can be deactivated, so that the energy consumption can be reduced.

For optimizing the energy consumption, the power control unit 130 may determine the needed set of active antennas, for example, so that the needed set of active antennas comprises a minimal number of needed active antennas satisfying the determined traffic load 112 (consequently satisfying the current wireless user demands) under consideration of the determined available cooperation capacity 122.

Figure 11:
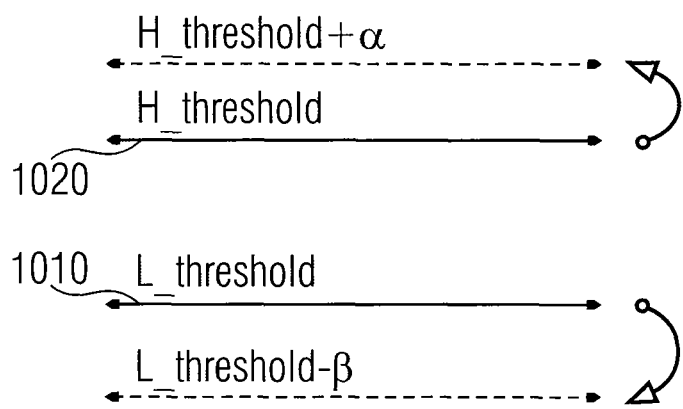
FIG. 11 is a schematic illustration of a reconfiguration of a high and a low threshold setting.

In some embodiments according to the invention, the upper load threshold 1020 and the lower load threshold 1010 are adapted to the current set of active antennas. For this, the power control unit 130 may adjust the upper load threshold 1020 and the lower load threshold 1010 after increasing or decreasing the number of active antennas. The thresholds may be adapted, for example, so that the current traffic load, which is satisfied by the current set of active antennas, is located between the upper load threshold 1020 and the lower load threshold 1010. In other words, the upper load threshold 1020 and the lower load threshold 1010 may be increased, if the number of active antennas is increased and the upper load threshold and the lower load threshold may be decreased, if the number of active antennas is decreased. This is illustrated in FIG. 11 for an increasing number of active antennas resulting in an increase of the threshold for the upper load threshold (H_threshold-α) and for a decreasing of the number of active antennas resulting in a decrease of the threshold for the lower load threshold (L_threshold-β).

In some embodiments according to the invention, the power control unit 130 may keep at least one antenna of the plurality of antennas of the node active so that a minimal data rate within the area (cell) covered by the node can be guaranteed. Further, in this way the node may be able to react faster to a varying load situation as well as at least a minimal cooperation capacity can be provided to neighboring nodes.

In the following, embodiments of the invention is described in more detail. Although different aspects of the invention are implemented together in this example, these aspects may also be realized independent from each other.

Figure 12:
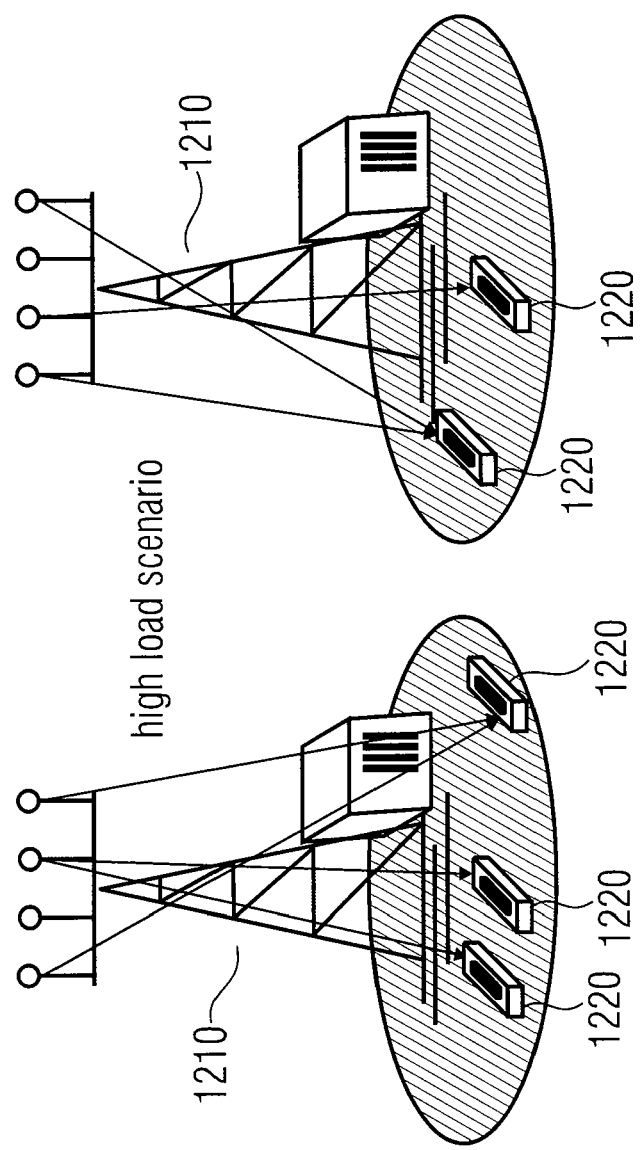
FIG. 12 is a schematic illustration of a high load scenario.
Figure 13:
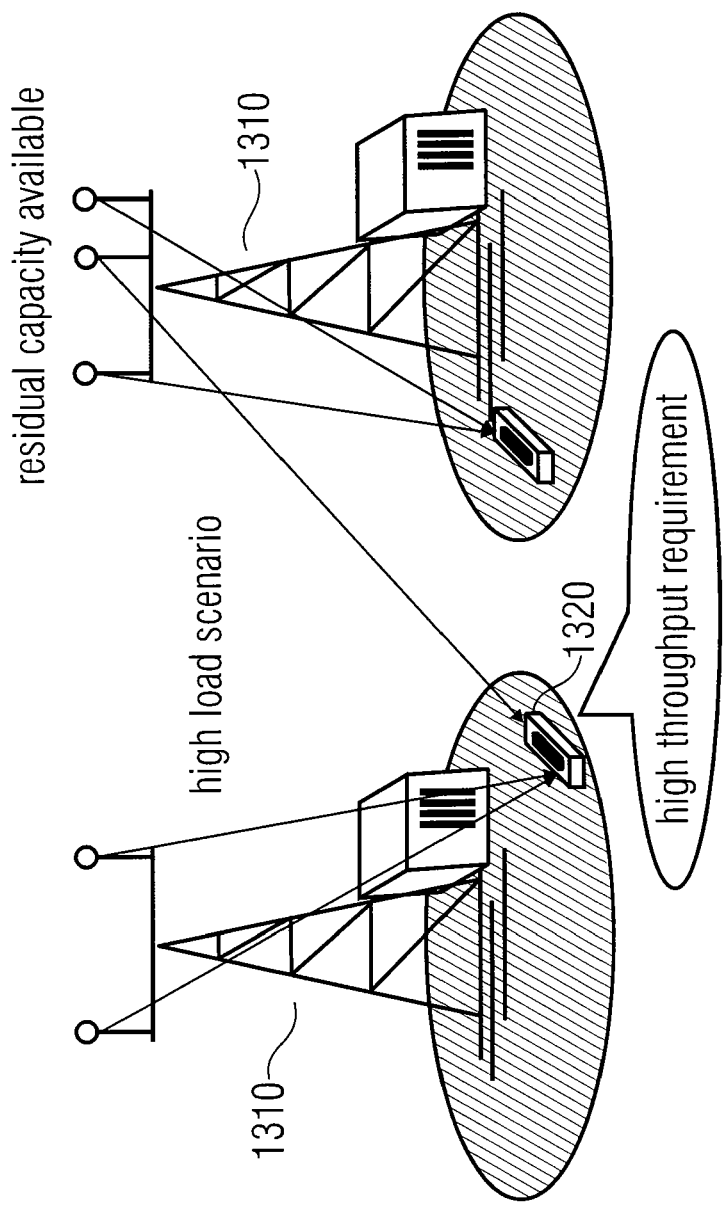
FIG. 13 is a schematic illustration of a low load scenario.

A cellular network scenario is considered where base stations are equipped with N transmit/receive antennas. Each antenna may be equipped with an analog RF transceiver module (referred also as a power amplifier) that controls the amplification gain of the transmitted/received signals. A base station equipped with N antennas will thus be equipped with N analog RF transceivers. Analog RF transceivers are the most energy consuming components at base stations. Based on this understanding, the proposed concept aims at switching off, for example, as many analog RF transceiver modules as possible at each base station, thus achieving high energy efficiency performance, while ensuring the QoS requirements of the mobile user(s). In other terms, the proposed concept may be able to configure a base station such that it can serve the connected mobile users with the needed QoS level, while using the minimum number of active analog RF transceiver modules. The actions taken by the proposed concept bay me triggered by the actual wireless traffic load present into the wireless cell. When the user traffic demand (e.g. expressed in Kbps) exits a certain threshold window, the algorithm may search for the most energy efficient antennae configuration that is able to fulfill the QoS needs of the users. Base station cooperation is eventually used to achieve this goal. Whereas a certain number of active antennae (or equivalently active analog RF transceivers or power amplifiers) is notable to fulfill the QoS requirements of the user(s), cooperation with neighbor base stations is further explored to exploit unused wireless capacity available at the neighbor cells. FIGS. 12 and 13 show the effect in the antennae configuration after applying the proposed concept.

FIG. 12 shows an example of two base stations 1210 of a wireless communication system in a high load scenario. Both base stations operate with four active antennas in order to fulfill the quality of service (QoS) requirements of all users 1220 (wireless user devices). Fittingly, FIG. 13 shows two base stations 1310 in a low traffic scenario. Only two out of four antennas are used at the base station on the left hand side (and three out of four antennas are used at the base station on the right hand side). The need of additional wireless resources, due to higher traffic demand of the user 1320, is eventually fulfilled by using wireless resources from the base station on the right hand side (residual capacity available). This illustrates the effect on the number of active antennas used for network operation.

The algorithm may ensure the use of a minimal set of analog RF transceiver modules at each cell site, while providing the needed level of network service at the minimal energy cost.

The algorithm may run in background, in a separate computation point or locally at each base station. The results of the computation process for the energy optimal antennae configuration are then used to actually deploy the established energy saving strategy.

Figure 14:
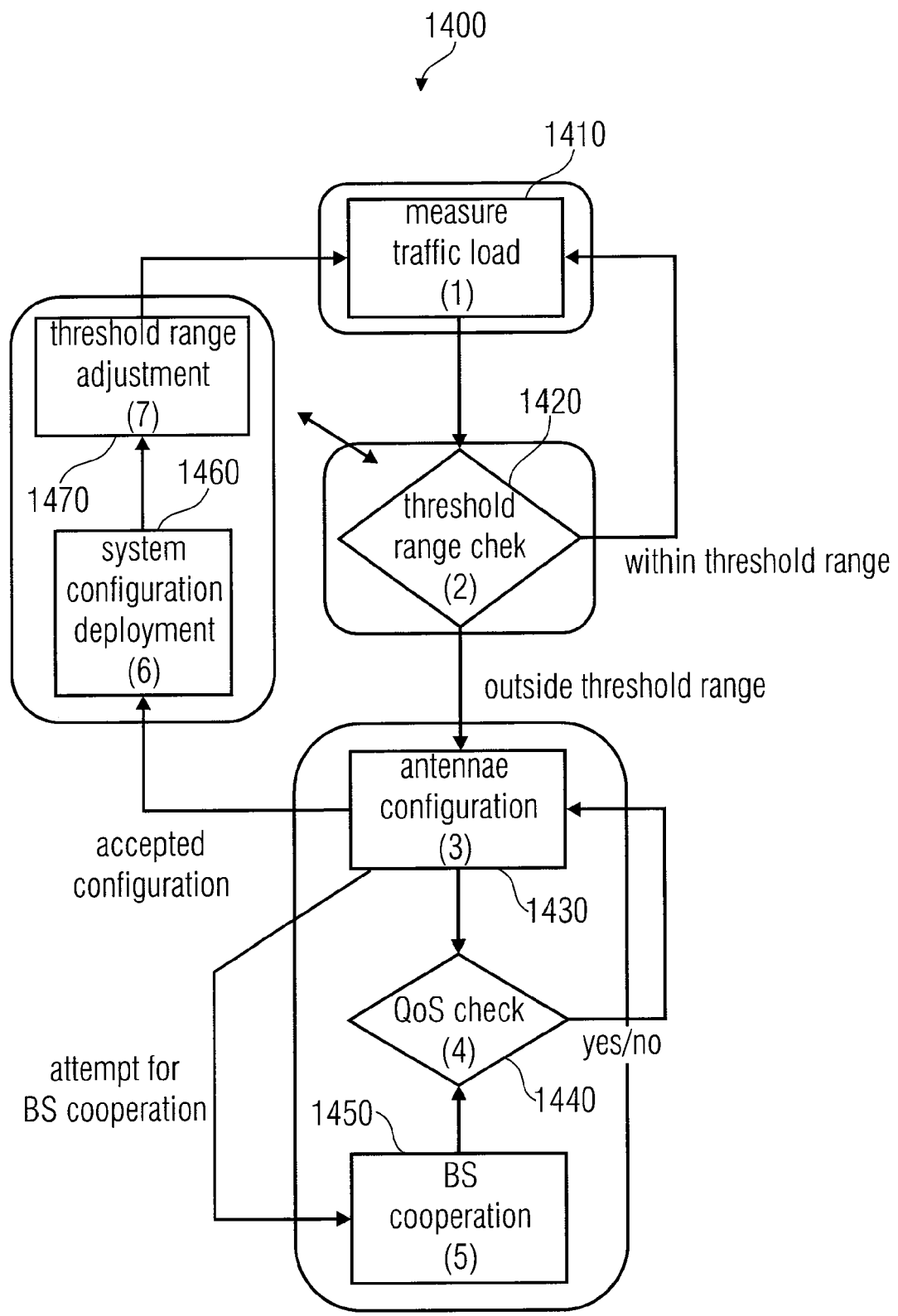
FIG. 14 is a unified modeling language diagram of an algorithm for controlling a node of a wireless communication system.

FIG. 14 shows a detailed unified modeling language diagram of a possible concrete implementation of the proposed concept 1400 (algorithm).

For example, the aim of the proposed concept is to fulfill the user QoS requirements at the lowest energy cost possible based on the current network conditions. The most relevant gain may be the reduction of the overall OPEX costs (operational expense costs) compared to normal network operation. Seven building blocks (in the diagram) concur to implement the energy saving scheme. The description of their individual functionalities as well as their interactions are discussed in the following.

The measure traffic load block 1410 is the processing unit, running for example at the base station or on a remote computation point, that measures the traffic load currently present in the wireless access network. This measurement can be constantly performed thanks to the continuous signaling data that active mobile terminals exchange with their base station. In the proposed scheme, it is assumed that the measurement output can be expressed in bits/second and it is represented by the sum of the traffic generated by each user, for example. The measure traffic load block 1410 may be realized by the traffic load determiner.

The threshold range block 1420 is the processing unit, running for example at the base station or on a remote computation point, that computes whether the activation of the proposed energy saving policy can be attempted or not. Two thresholds are used for this goal (FIG. 10). Whenever the measured wireless traffic load is below the lower (load) threshold 1010 (L_threshold) or above the higher (load) threshold 1020 (H_threshold), this information is passed to the antennae configuration block 1430 to activate the appropriate antennae configuration settings. When the measured wireless traffic load remains between the two thresholds, no action is taken and the algorithm returns the control to the measure traffic load block 1410. The setting of the thresholds is performed at the threshold range adjustment block 1470 according to the policy described below. The threshold range block 1420 may be realized by the power control unit.

The antennae configuration block 1430 is the processing unit, running for example at the base station or on a remote computation point, that determines the minimum number of local antennae needed to fulfill the user(s) QoS requirements with the current wireless traffic pattern. The antennae configuration block 1430 may be realized by the power control unit.

The actions taken at this block depend either on the wireless traffic load report (determined traffic load) coming from the threshold range block 1420 or from the QoS (quality of service) measurement test that is performed at the user QoS check block 1440.

Let's first analyze the actions based on the wireless traffic load report coming from the threshold range block 1420.

If the reported wireless traffic load, as measured at the measure traffic load block 1410, is below L_threshold, a certain number x of PA (antennae, power amplifier) is switched off, as shown in FIG. 10. The value of variable x can be assigned by using for example a stepwise function that maps the amount of wireless traffic reduction, say δ, to the number x of PA (power amplifier) that will be switched off. One possible antennae configuration policy could then be to switch off as many antennae as possible based on the amount of wireless traffic reduction δ.

If the measured wireless traffic load is above the H_threshold, a certain number y of PA (antennae, power amplifier) is switched on, as shown on FIG. 10. The value of variable y can be assigned by using for example a stepwise function that maps the amount of wireless traffic reduction, say γ, to the number y of PA that will be switched on. One possible policy could then be to switch on as few antennae as possible based on the amount of wireless traffic increment γ.

Now let's take into account the actions taken at the antennae configuration block 1430 when the input occurs from the user QoS check block 1440. The user QoS check block 1440 has the role to assess the achievement of the QoS requirements of the user(s). The result can be either positive or negative. Based on this result, different actions are taken at the antennae configuration block 1430.

If the reduction of the number of active antennae is not sufficient to fulfill the users QoS requirements, the antennae configuration block first resorts on base station cooperation in order to scout for further wireless resources, which could be used to fill the QoS gap. Referring to FIG. 14, this action is indicated by arrow connecting the antennae configuration block 1430 to the base station cooperation block 1450.

If base station cooperation allows for user(s) QoS achievement, then the antennae configuration is accepted and the deployment of the selected cooperation strategy is executed through the system configuration deployment block 1460.

If the reduction of the number of active antennae is sufficient to fulfill the users QoS requirements, before deploying such a configuration, the antennae configuration block first checks if further analog RF transceivers can be switched off. A new configuration, with a lesser number of active antennae, is then attempted. Depending on the outcome from the user QoS check block 1440, the antennae configuration block can (i) continue to shut down analog RF transceivers, if the QoS requirement were still achievable with such a configuration, or can (ii) attempt to use base station cooperation, to achieve the desired QoS level.

The procedure stops as soon as no configuration able to achieve the desired QoS level is found. In this case, the antennae configuration block will resume the latest working configuration that ensures the target QoS level for the users and adopts the minimum number of active analog RF transceivers.

The resulting system configuration (set of active antennas) is given to the system configuration deployment block 1460 for actual deployment.

The user QoS check block 1440 is the processing unit, running for example at the base station or on a remote computation point, that determines whether or not the present antennae configuration is able to provide the user(s) with the needed QoS requirements. This operation can be performed by checking if the overall available radio resources (local ones plus those eventually deriving from base station cooperation) can provide the desired QoS level to the user(s). The QoS assessment is performed by means of evaluating the current user throughput requirements and the possibility of fulfilling them based on the actual channel quality and available radio resources. The user QoS check block 1440 may be realized by the power control unit.

The result of the QoS test is passed again to the antennae configuration block 1430 for the evaluation of the subsequent actions.

The base station cooperation block 1450 is the processing unit, running at the base station or on a remote computation point, that determines whether or not there exists a possible base station cooperative set that is able to provide additional wireless resources to the requesting base station. This mechanism can be implemented by means of a resource request inquiry process to the neighboring base stations, which will respond according to their capability of cooperating or not and the eventual amount of radio resources they can provide. The requirements on the needed backhaul capacity for enabling base station cooperation may also be taken into account at this computation stage. The output of this configuration is given to the user QoS check block 1440 for QoS assessment. The base station cooperation block 1450 may be realized by the cooperation capacity determiner.

The system configuration deployment block 1460 is the processing unit, running at the base station or on a remote computation point, that is in charge to deploy the actual antennae configuration at the local base station together with the eventual base station cooperation process, whether it is needed for achieving the targeted QoS. The control is then passed to the threshold range adjustment block 1470 for threshold range adjustment. The system configuration deployment block 1460 may be realized by the power control unit.

The threshold range adjustment block 1470 is the processing unit, running at the base station or on a remote computation point, that is in charge to set the L_threshold and H_threshold that are used to determine whether any energy saving policy can be activated or not with the current user traffic pattern. The threshold range adjustment block 1470 may be realized by the power control unit.

If the measured user traffic demand that originated the antennae configuration adjustment was higher than the H_threshold, then the H_threshold is set to the new value plus a certain quantity α, to avoid repetitive settings of the antennas due to slight variations of the user traffic demands.

If the measured user traffic demand that originated the antennae configuration adjustment was lower than the L_threshold, then the L_threshold is set to the new value minus a certain quantity β, to avoid repetitive settings of the antennas due to slight variations of the user traffic demands.

The overall mechanism ensures that any slight traffic oscillation remains within the H_and L_threshold range, without repetitive settings of active antennae and eventual cooperative base station sets (FIG. 11). The control is then given back to block 1410 for resuming the user traffic measurements.

Some embodiments according to the invention relate to a method and/or an apparatus for saving energy in cellular networks by disabling RF (radio frequency) transceiver units at base stations by applying network MIMO techniques or saving energy in cellular networks by disabling transceiver units at base stations and applying network MIMO and/or cooperative multipoint techniques.

For example, a concept for deploying the minimal number of active antennas at each base station of a wireless cellular system for minimizing the overall energy consumption of the mobile network is described. As a constraint to the solution, it may be imposed that the QoS requirements of the mobile users are to be guaranteed anytime.

Whenever the wireless traffic is below or above a certain threshold window, that may be dynamically set according to the current network conditions, a mechanism that searches the most energy efficient antennae configuration at each base station is activated by exploiting network MIMO techniques. The resulting antenna configuration may be constrained by the fulfillment of the QoS needs of the active users. The proposed concept aims at minimizing the number of active RF transceivers leveraging on cooperation of base stations, which avoids to re-activate antennas when new traffic requests from the users occur. Whereas the use of network MIMO cooperation is not sufficient to achieve the QoS requirements of the users, antennae are re-activated again to guarantee the service.

The proposed concept may achieve the minimal active antennae configuration scheme at fast time, thus providing benefits in terms of energy consumption.

The described concept may be used in the field of mobile network architecture, wireless cooperation, network MIMO, green networking and/or base station cooperation. By using the described concept the operation expenses (OPEX) in mobile access networks may be reduced. Further, the concept may be used for energy saving and/or in network-centric MIMO.

For example, the low load traffic scenarios are targeted by the described concept as the reference points were introduced to energy saving mechanisms.

The proposed concept may use network MIMO base station cooperation to achieve energy saving. For this, the lowest number of active antennas may be selected leveraging on resources available from multiple neighbors.

Compared to previous techniques, and in particular cell breathing ones, the proposed concept may ensure that the most energy efficient antennae configuration is adopted during low load system operation. Whenever further traffic demands come from the users, the system checks if, before re-activating some antennas, all the available and unused resources from the neighbors are exploited by network MIMO base station cooperation. On the other hand, cell breathing techniques cannot exploit this flexibility, and in some circumstances they could need the re-activation of whole base stations.

Significant OPEX reduction can be achieved with adoption of the proposed concept.

As it was already shown by FIG. 14, an example for an implementation of the described concept may comprise measuring of offered traffic, checking if users traffic is lower than a certain threshold, (loop) reconfiguring antennas and enable base station cooperation to switch off as many antennas as possible, checking if users quality of service is fulfilled, deploying configuration, reconfiguring thresholds and going back to traffic measurements.

Figure 15B:
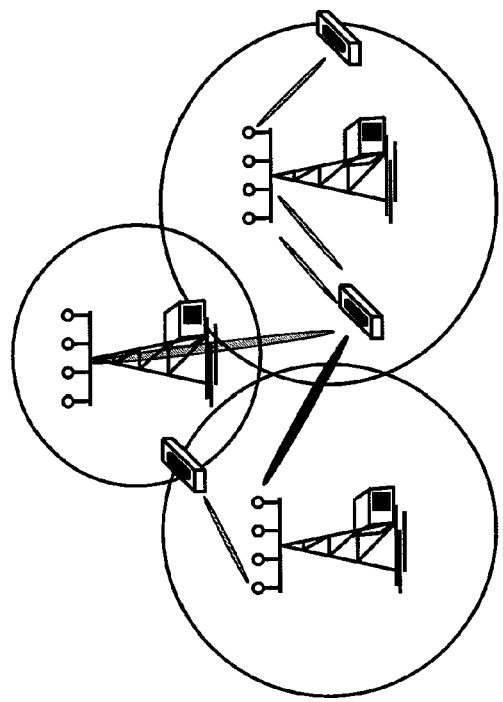
FIG. 15b is a schematic illustration of a wireless communication system using network MIMO.
Figure 15A:
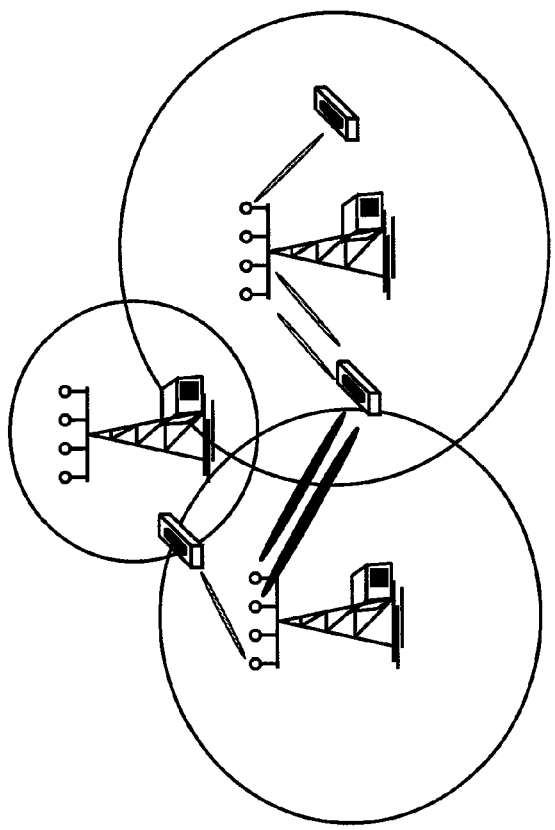
FIG. 15a is a schematic illustration of a wireless communication system using a cell breathing technique.
Figure 16B:
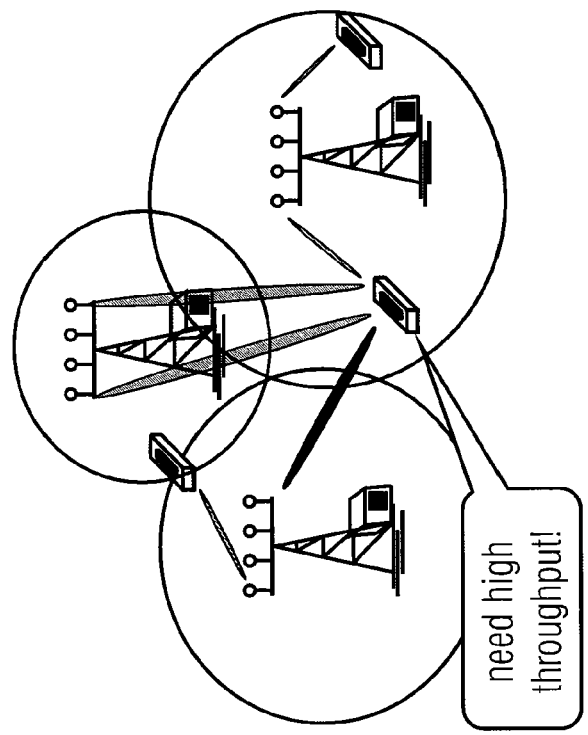
FIG. 16b is a schematic illustration of a wireless communication system using network MIMO.
Figure 16A:
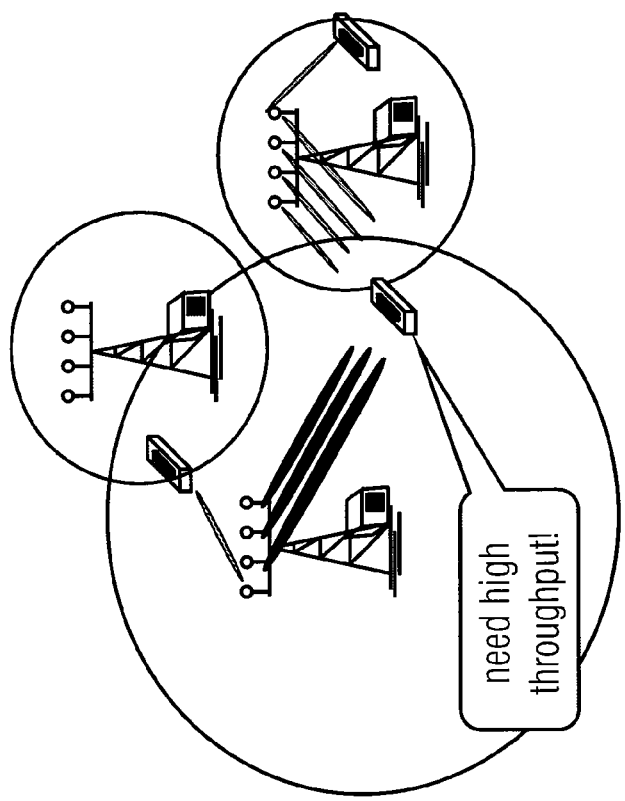
FIG. 16a is a schematic illustration of a wireless communication system using a cell breathing technique.

The described concept may use a cooperative network-MIMO technique to provide the service to the users at the lowest energy consumption costs, for example. Other approaches use cell breathing techniques, as it is shown in FIG. 15*a*. Compared to this, the network-MIMO combines resources from multiple neighbor cells, for example through joint precoding techniques (multiple serving base stations at same time), as it is shown in FIG. 15*b*. The cell breathing only considers local resources (one serving base station at a time). This is once again illustrated in FIG. 16*a* for a wireless device in need of high throughput. Compared to this, the described concept may keep the lowest number of active antennas and provide additional resources from multiple cooperating base stations resulting in major energy savings, as it is shown in FIG. 16*b* for a wireless device in need of high throughput.

By using the described concept, major operation expense savings (OPEX) may be achieved. Further, an energy efficient network operation in low traffic load condition and/or a use of a lowest number of active antennas or power amplifiers while achieving user quality of service (QoS) requirements anytime may be enabled.

Some embodiments according to the invention relate to a method and/or an apparatus for saving energy in cellular networks by deactivating the maximum number of transceiver units or antennas of a base station by cooperating with neighbor base stations using network MIMO techniques (without switching off the entire base station).

According to an aspect, the method and/or the apparatus may work in a greedy way, dynamically activating or deactivating the transceiver units by using a step function that maps the decrease or increase of traffic load on a certain number of transceiver units that are switched on or off at once.

According to another aspect, the method and/or apparatus may check whether the deactivation of the MIMO transceiver units at the base station is possible without violating the users quality of service requirements by checking whether the remaining radio resources (the remaining wireless transmission rate) at the base station and cooperating ones are sufficient to fulfill the users requirements.

Further, the method and/or apparatus may automatically adapt the threshold for the dynamic deactivation or activation process by defining a threshold window based on the current network load (after deactivating or activating transceiver units).

According to an aspect, the method and/or apparatus may select the set of cooperative base stations with which negotiating the borrowing of resources for achieving the desired QoS level for the users. For this, also properties of the wireline core network of the wireless communication system (e.g. latencies, capacities) may be considered.

Figure 17:
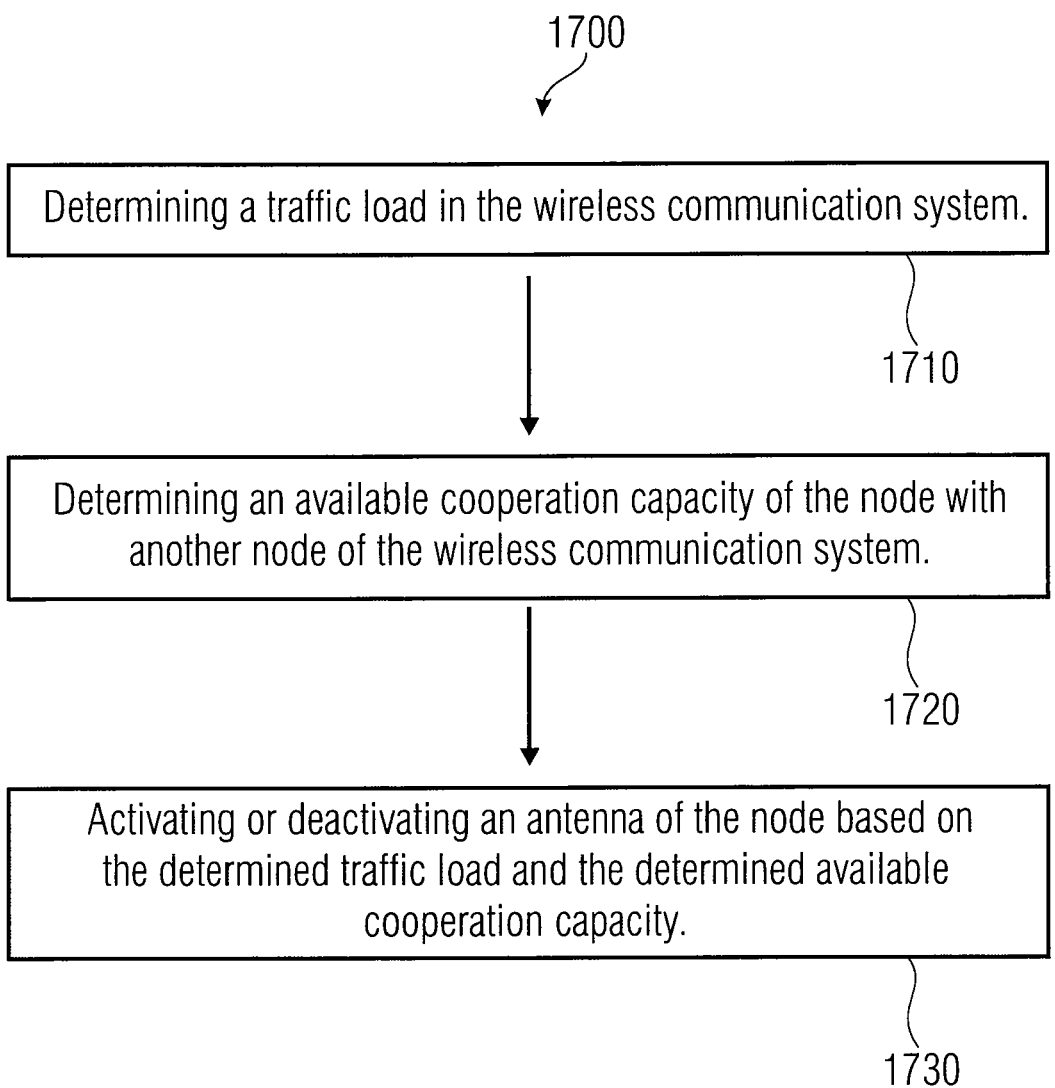
FIG. 17 is a flowchart of a method for controlling an node of a wireless communication system.

FIG. 17 shows a flowchart of a method 1700 for controlling a node of a wireless communication system according to an embodiment of the invention. The node comprises a plurality of antennas. The method 1700 comprises determining 1710 a traffic load in the wireless communication system and determining 1720 an available cooperation capacity of the node with another node of the wireless communication system. Further, the method 1700 comprises activating or deactivating 1730 an antenna of the node based on the determined traffic load and the determined available cooperation capacity.

Additionally, the method 1700 may comprise further optional steps representing aspects of the different embodiments described above.

Although some aspects of the described concept have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. An apparatus for controlling a node of a wireless communication system, wherein the node comprises a plurality of antennas, the apparatus comprising:
   a processing device configured to determine a traffic load in the wireless communication system;
   processing device configured to determine an available cooperation capacity of the node with another node of the wireless communication system; and
   a power control unit configured to deactivate one or more antennas of the plurality of antennas of the node based on the determined traffic load and the determined available cooperation capacity,
   wherein the one or more antennas of the plurality of antennas are deactivated in response to determination by the power control unit that a quality of service constraint of at least one wireless user device can be fulfilled by using the remaining one or more active antennas of the node and at least partly the determined available cooperation capacity.

2. The Apparatus according to claim 1, wherein the power control unit is configured to decrease a number of active antennas of the plurality of antennas of the node, if the determined traffic load is lower than a lower load threshold, and increases the number of active antennas, if the determined traffic load is higher than an upper load threshold.

3. The Apparatus according to claim 2, wherein the power control unit is configured to adjust the upper load threshold and the lower load threshold after increasing or decreasing the number of active antennas.

4. The Apparatus according to claim 1, wherein the power control unit is configured to determine a needed set of active antennas of the plurality of antennas based on the determined traffic load and the determined available cooperation capacity, if the determined traffic load is higher than an upper load threshold or lower than a lower load threshold, wherein the power control unit is configured to activate or deactivate an antenna of the node based on the determined needed set of antennas.

5. The Apparatus according to claim 4, wherein the power control unit is configured to determine the needed set of active antennas, so that the needed set of active antennas comprises a minimal number of needed active antennas satisfying the determined traffic load under consideration of the determined available cooperation capacity.

6. The Apparatus according to claim 1, wherein the processing device is configured to transmit a cooperation capacity request to at least one neighboring node and to determine the available cooperation capacity based on a cooperation capacity respond received from the at least one neighboring node.

7. The Apparatus according to claim 1, wherein the power control unit is configured to activate or deactivate an antenna of the node by activating or deactivating a power amplifier of a transmitter connected to the antenna.

8. The Apparatus according to claim 1, wherein the power control unit is configured to keep at least one antenna of the plurality of antennas of the node active.

9. A method for controlling a node of a wireless communication system, wherein the node comprises a plurality of antenna, the method comprising:
   determining, using a processing device, a traffic load in the wireless communication system;
   determining, using the processing device, an available cooperation capacity of the node with another node of the wireless communication system; and
   deactivating one or more antennas of the plurality of antennas of the node based on the determined traffic load and the determined available cooperation capacity,
   wherein the one or more antennas of the plurality of antennas are deactivated when it is determined that a quality of service constraint of at least one wireless user device can be fulfilled by using the remaining one or more active antennas of the node and at least partly the determined available cooperation capacity.

10. A non-transitory computer readable medium including program code for controlling a node of a wireless communication system when executed by a processor, wherein the node comprises a plurality of antenna, the computer readable medium comprising:
   instructions to determine a traffic load in the wireless communication system;
   instructions to determine an available cooperation capacity of the node with another node of the wireless communication system; and
   instructions to deactivate one or more antennas of the plurality of antennas of the node based on the determined traffic load and the determined available cooperation capacity,
   wherein the instructions to deactivate the one or more antennas of the plurality of antennas include instructions to determine that a quality of service constraint of at least one wireless user device can be fulfilled by using the remaining one or more active antennas of the node and at least partly the determined available cooperation capacity.

* * * * *